(12) United States Patent
Haggard et al.

(10) Patent No.: US 10,264,137 B2
(45) Date of Patent: Apr. 16, 2019

(54) METHOD AND SYSTEM TO CONTROL EXPENSE AND USAGE OF SUBSCRIPTIONS IN A MOBILE DEVICE

(71) Applicant: Sensorise Digital Services Pvt. Ltd., New Delhi (IN)

(72) Inventors: Jonas Haggard, Bromma (SE); Sharad Arora, Nodia (IN)

(73) Assignee: Sensorise Digital Services Pvt. Ltd., New Delhi (IN)

( * ) Notice: Subject to any disclaimer, the term of this patent is extended or adjusted under 35 U.S.C. 154(b) by 0 days.

(21) Appl. No.: 15/648,671

(22) Filed: Jul. 13, 2017

(65) Prior Publication Data
US 2018/0020100 A1  Jan. 18, 2018

(30) Foreign Application Priority Data

Jul. 14, 2016 (IN) .............................. 201611024141

(51) Int. Cl.
*H04W 8/18* (2009.01)
*H04M 15/00* (2006.01)
(Continued)

(52) U.S. Cl.
CPC .......... *H04M 15/39* (2013.01); *H04B 1/3816* (2013.01); *H04M 15/8016* (2013.01);
(Continued)

(58) Field of Classification Search
CPC . H04W 48/18; H04W 52/0254; H04W 12/06; H04W 28/0268; H04W 28/0289;
(Continued)

(56) References Cited

U.S. PATENT DOCUMENTS

| 2004/0148237 A1* | 7/2004 | Bittmann | G06Q 30/02 |
| | | | 705/35 |
| 2012/0196644 A1* | 8/2012 | Scherzer | H04W 48/18 |
| | | | 455/524 |

(Continued)

*Primary Examiner* — Quan M Hua
(74) *Attorney, Agent, or Firm* — Vedder Price, P.C.

(57) ABSTRACT

A system to control usage of a subscription in a mobile device comprising: a plurality of subscriptions of at least two or more mobile networks; a subscription profile associated with each subscription; a UICC/eUICC/USIM/SIM card capable of switching among different networks; an applet running on the said SIM card; a server which communicates with the said mobile device through a network interface; a server process which stores identity and network related data of each subscription profile; stores network territory and coverage map; stores history of network drops and subscription profile switch events; stores quota-price-validity-bandwidth attached to each subscription profile; connects to the networks providing the subscription profile periodically, to retrieve, calculate and store actual usage and outstanding quota and validity for SMS, data and minutes for each subscription profile; connects to the SIM applet to receive information from the applet about network loss and network coverage; determines and stores best network, preferred network, and available network periodically; and communicates and commands the SIM card applet to initiate selection of subscription based on available quota, validity and coverage.

4 Claims, 5 Drawing Sheets

(51) Int. Cl.
*H04B 1/3816* (2015.01)
*H04W 4/24* (2018.01)
*H04W 8/02* (2009.01)
*H04W 88/06* (2009.01)
*H04W 48/18* (2009.01)
*H04W 12/06* (2009.01)

(52) U.S. Cl.
CPC ............... *H04W 4/24* (2013.01); *H04W 8/02* (2013.01); *H04W 8/18* (2013.01); *H04W 8/183* (2013.01); *H04W 12/06* (2013.01); *H04W 48/18* (2013.01); *H04W 88/06* (2013.01)

(58) Field of Classification Search
CPC ........... H04W 4/50; H04W 4/70; H04W 8/18; H04W 8/183
See application file for complete search history.

(56) References Cited

U.S. PATENT DOCUMENTS

| | | | | |
|---|---|---|---|---|
| 2014/0045529 A1* | 2/2014 | Bolon | .................... | H04W 4/028 455/456.1 |
| 2015/0230109 A1* | 8/2015 | Socaciu | ................ | H04W 64/00 455/418 |
| 2015/0382178 A1* | 12/2015 | Park | .................... | H04L 63/0853 455/411 |

* cited by examiner

METHOD AND SYSTEM TO CONTROL EXPENSE AND USAGE OF SUBSCRIPTIONS IN A MOBILE DEVICE

CROSS-REFERENCE TO RELATED APPLICATIONS

This application claims the benefit of and priority from Indian Application No. 201611024141, filed Jul. 14, 2016, which is wholly incorporated herein by reference.

FIELD OF THE INVENTION

The present invention relates to a method and a system to control expense and usage of a subscription in a mobile device based on knowledge of different parameters. In particular, the present invention relates to providing the most frugal service that meets the service level assurance provided to the mobile customer.

BACKGROUND

With the arrival of the M2M/IoT revolution, the requirement for frugal and continuous connectivity has become very prominent. This is ironic for the fact that network technologies and network providers had begun to look at 100 s of MBPS as the holy grail of measuring technology's effectiveness.

Historically, the telecommunication term Quality of Service (QoS) has indicated how good the network performs for a certain user of the network. In recent years, as telecommunication use has increased, so has the demand for higher quality. Due to constraints of bandwidth and network resources, users are experiencing dropped calls or slow data connections. However, users expect the networks to perform better over time, and hence, there is a significant issue that network providers are dealing with, especially in the emerging markets. There are also new use cases and services that require an even better quality and availability of the network (such as e-call, Tele-medicine, streaming, surveillance, multi-party video conferencing, real time gaming, etc.) compared to the calling and infotainment services of the past (such as browsing, mailing, etc.)

As with any terrestrial radio network, a 100% coverage is not possible since there may be objects obstructing radio waves between base station and the user, such as buildings (urban) or mountains (rural). In urban environments, it is especially difficult (and expensive) to plan an optimal network, as transceivers cannot be placed ideally.

GSM, UMTS, and LTE networks try to minimize the risk of a network loss by ensuring that the device tries to select the cell with the best signal to noise ratio at its location if its current cell drops below a certain threshold.

There are other systems and methods that provide similar solutions by utilizing roaming subscriptions or by updating subscriptions. However, they are not able to ensure that the quotas are used uniformly in order to avoid additional fees. Thus, there is a need to devise a system and a method that mitigates the above mentioned drawbacks.

OBJECT OF THE INVENTION

It is an object of the present invention to provide a system and a method to control the expense and usage of a subscription in a mobile device based on the knowledge about the price plan, quota, validity, call drops, position, network and network quality in order to provide the most frugal service that meets the service level assurance provided to a mobile customer.

SUMMARY OF THE INVENTION

The present invention discloses a system and a method to address the above mentioned problems and enhance the user experience by providing the most frugal and seamless connectivity of the network. The present invention works by having various service providers/mobile operators within a given territory which are saved as subscription profiles on the Subscriber Identity Module card (SIM card). The actual usage requirement for calling and/or messaging and/or live chat and/or internet surfing or the like is determined upfront and represented as quotas and is stored in the SIM card. Further, according to the requirement, the expected usage is distributed between the various subscription profiles by evaluating the available quota, applicable price plan, subscription validity, available network, available network bandwidth, the history of dropped calls and the like so as to optimize the connection cost of the subscriber. The SIM card controls the authentication process of the networks to connect and therefore controls the subscription profile usage. To follow the aforementioned process, the SIM card should be inserted in the mobile device. The mobile device then reads the SIM and its network profile. It then distinguishes which network/mobile providers are acceptable to use and which are not allowed, by radio scanning for the best available network. The mobile device will then initiate an authentication process towards the best allowed network.

The present invention discloses a system to control usage of a subscription in a mobile device comprising: a plurality of subscriptions of at least two or more mobile networks; a subscription profile associated with each subscription; a UICC/eUICC/USIM/SIM card capable of switching among different networks; an applet running on the said SIM card; a server which communicates with the said mobile device through a network interface; a server process which stores identity and network related data of each subscription profile; stores network territory and coverage map; stores history of network drops and subscription profile switch events; stores quota-price-validity-bandwidth attached to each subscription profile; connects to the networks providing the subscription profile periodically, to retrieve, calculate and store actual usage and outstanding quota and validity for SMS, data and minutes for each subscription profile; connects to the SIM applet to receive information from the applet about network loss and network coverage; determines and stores best network, preferred network, available network periodically; and communicates and commands the SIM card applet to initiate selection of subscription based on available quota, validity and coverage.

The present invention also discloses a method to control the usage of a subscription in a mobile device comprising the steps of: initial selection of the subscription most appropriate for the device requesting a connection establishing a wireless communication between a mobile device and a base station; receiving a signal from a mobile operator; receiving the information about the balance of quota and validity of subscription from a network interface; determining if a network has quota and validity; switching the network through a subscription profile.

BRIEF DESCRIPTION OF THE DRAWINGS

The accompanying drawings constitute a part of the description and are used to provide further understanding of the present invention. Such accompanying drawings illustrate the embodiments of the present invention which are used to describe the principles of the present invention together with the description.

DETAILED DESCRIPTION OF THE INVENTION

Figure 1:
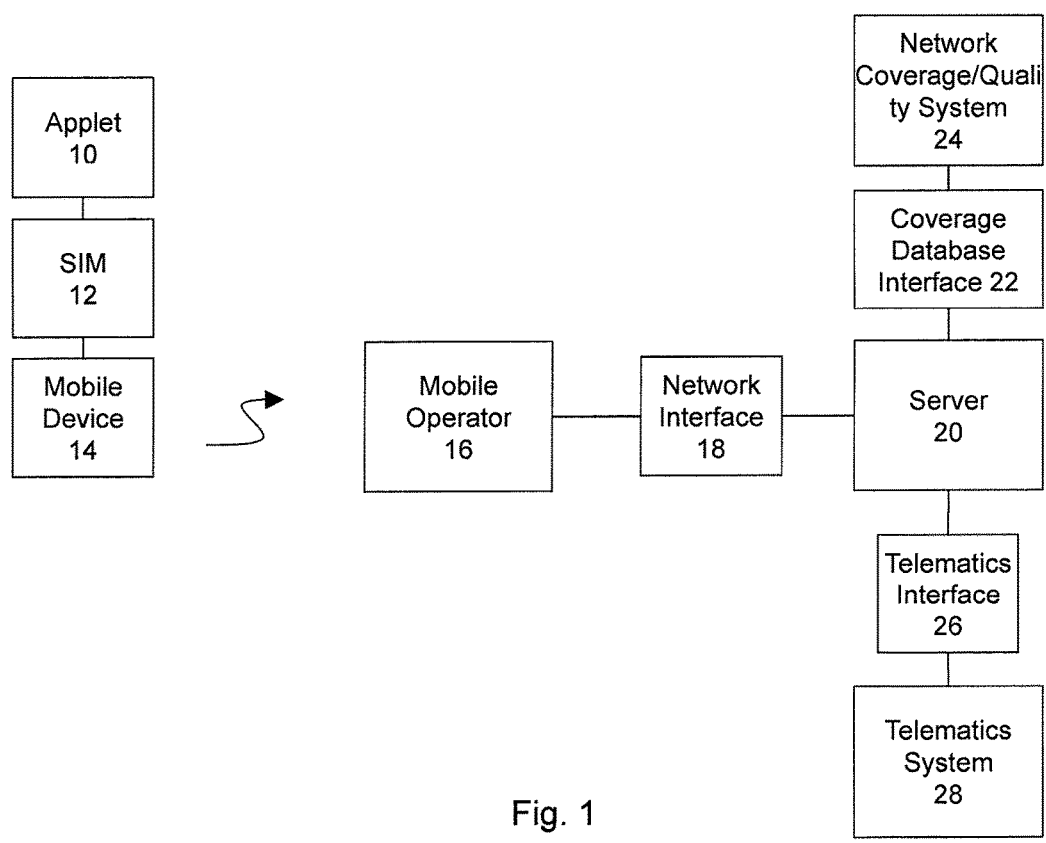
FIG. 1 illustrates a block diagram of the components involved according to an embodiment of the present invention.

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. The embodiment provided herein is for the purpose of filing the present provisional specification; however, further embodiments within this disclosure are possible and shall/may be covered in the complete specification.

The present invention relates to a system and a method to control the expense and usage of a subscription in a mobile device based on the knowledge about the price plan, quota, validity, call drops, position, network and network quality in order to provide the most frugal service that meets the service level assurance provided to a mobile customer. The present invention discloses a process that works by having multiple network operator relationships for data, sms and voice services within the same telecom territory. Each of these relationships are created as subscription profiles on a SIM card. The actual usage requirement for a specific use case is determined upfront and represented in terms of data, sms, and voice quotas. The expected usage is then distributed between the subscription profiles in a manner that selection of the subscription profile optimizes the connection cost incurred in keeping the mobile device connected to one amongst the available networks, by evaluating the available quota, applicable price plan, subscription validity, available network, available network bandwidth and the history of dropped calls or network switches.

According to the present invention, the SIM card controls authentication to the network and may therefore be used to control the subscription profile that is selected. The device reads the SIM card and its network profile to understand which networks are acceptable to use, and which are not allowed. This enables the device radio scanning to search for the best available network. The device then initiates an authentication process towards the best allowed network, but it is the SIM card, and the active subscription, that will do the actual authentication. For the authentication process, the subscription of a network profile is provided with a unique identifier (IMSI) and a unique key (Ki) which only the SIM card and the network are aware of. The key is used for authenticating to a network and works only for that specific network.

The method for controlling which subscription profile is used is managed in the following two ways.

Update the SIM with content to initiate the device in searching for a certain network, or to prevent the device from trying a certain network. This is often done in roaming steering solutions, but requires the active subscription to be allowed to roam on the different networks.

Update the SIM to a different active profile. This not only provides different available networks, it also affects which network it will latch on to.

The present invention requires following components to implement the process and system to provide the most frugal service that meets the service level assurance provided to a mobile customer.

A subscription from at least two or more mobile networks/operators within the same territory;

A SIM card with a function that can switch between the multiple subscription profiles; and A server process that is able to store identity and network related data of each subscription profile;

store network territory and coverage map;

store history of network drops and subscription profile switch events;

store quota-price-validity-bandwidth attached to each subscription profile;

connect to the networks providing the subscription profile periodically, to retrieve, calculate and store actual usage and outstanding quota and validity for SMS, data and minutes for each subscription profile;

connect to the SIM applet to receive information from the applet about network loss and network coverage;

determine and store best network, preferred network, and available network periodically; and communicate with and command the SIM card applet to initiate selection of subscription based on available quota, validity and coverage.

FIG. 1 illustrates a block diagram of the components involved according to an embodiment of the present invention. As illustrated in the figure, a mobile device 14 is provided having a SIM card 12 and an applet 10. The applet 10 is a small program running on the SIM 12. The program implements a process to switch between different mobile operator/network profiles based on either an instruction from a server 20 to switch, or because of loss of network connection by the mobile device 14 from a mobile operator 16. The applet 10 communicates using short message service, SMS and the like. The SIM card 12 is prepared as per the relevant ETSI (European Telecommunications Standards Institute) standards and GSMA guidelines. It is customized to the extent that it stores the multiple subscription profiles ordered by the entity responsible for the SIM 12. The mobile device 14 is in communication with a server 20 via the mobile operator. The mobile operator/network 16 may be a standard GSM/CDMA/3G/4G/5G/WiFi network, or any network that works as per ETSI standards and GSMA specifications. The server 20 is in communication with the mobile network 16 via a network interface 18. The network interface 18 between the mobile network 16 and the server 20 is used to transmit commands between the server 20 and the applet 10, get real time information about prices, quotas and validity from the network operators of the mobile networks 16 to the server 20 and also command status of the subscription to the network operator for lifecycle management of the subscription. The server 20 is connected to a network/coverage quality system 24 through a coverage database interface 22. The coverage database interface 22 between a third party location/coverage system 24 and the server 20 may be used to receive information of the mobile network presence and coverage to improve the decision making within the server 20. The server 20 is also connected to a third party telematics system 28 though a telematics interface 26 to receive information of a mobile device 14 that has lost connection with a mobile network 16, to improve the quality of service and decision making within the server 20.

Figure 2:
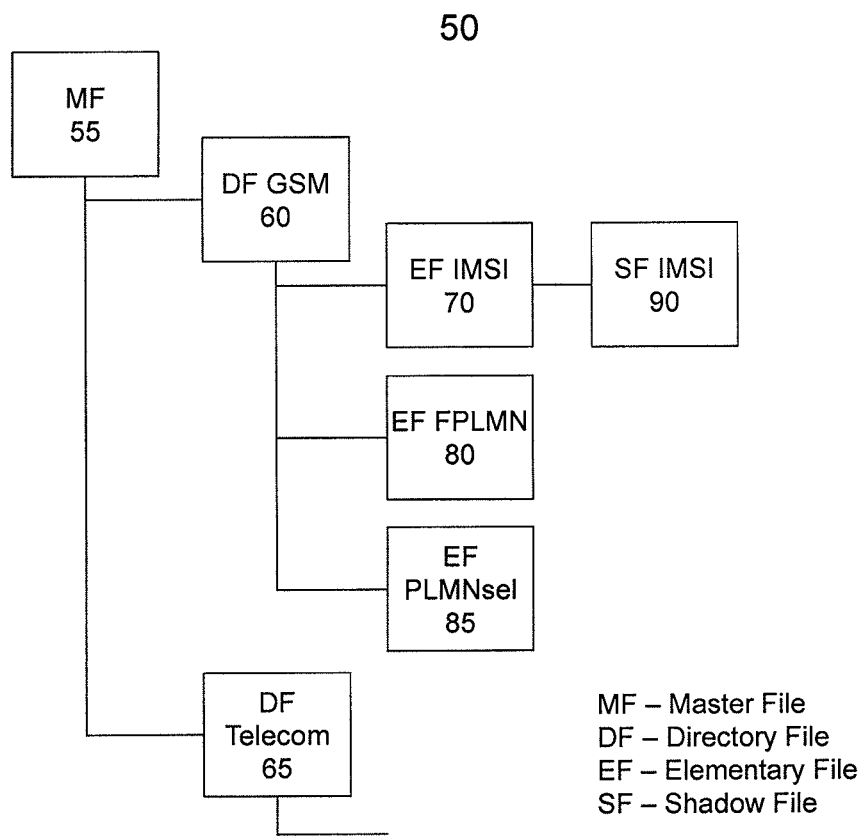
FIG. 2 illustrates structure of a file-system according to an embodiment of the present invention.

FIG. 2 illustrates structure of a file-system 50 of a SIM according to an embodiment of the present invention. At the top of the hierarchy is a master file 55, which acts as a root directory from where all files can be found in a tree like hierarchy. Some of these files are vital for a device to connect to a network, most important being the EF IMSI 70, which contains identity (IMSI) of the subscription, used to authenticate to the network. Typically, the EF IMSI 70 has file properties such as update—never, read—always to protect identity of the subscription. The corresponding shared secret key (Ki) does not even have a file representation as it should not be read nor changed through the use of the file-system. The device will issue a challenge command to the SIM where the SIM will internally read the shared secret and determine a response. The response is then sent back to the device and the network for authentication and further processing.

Figure 3:
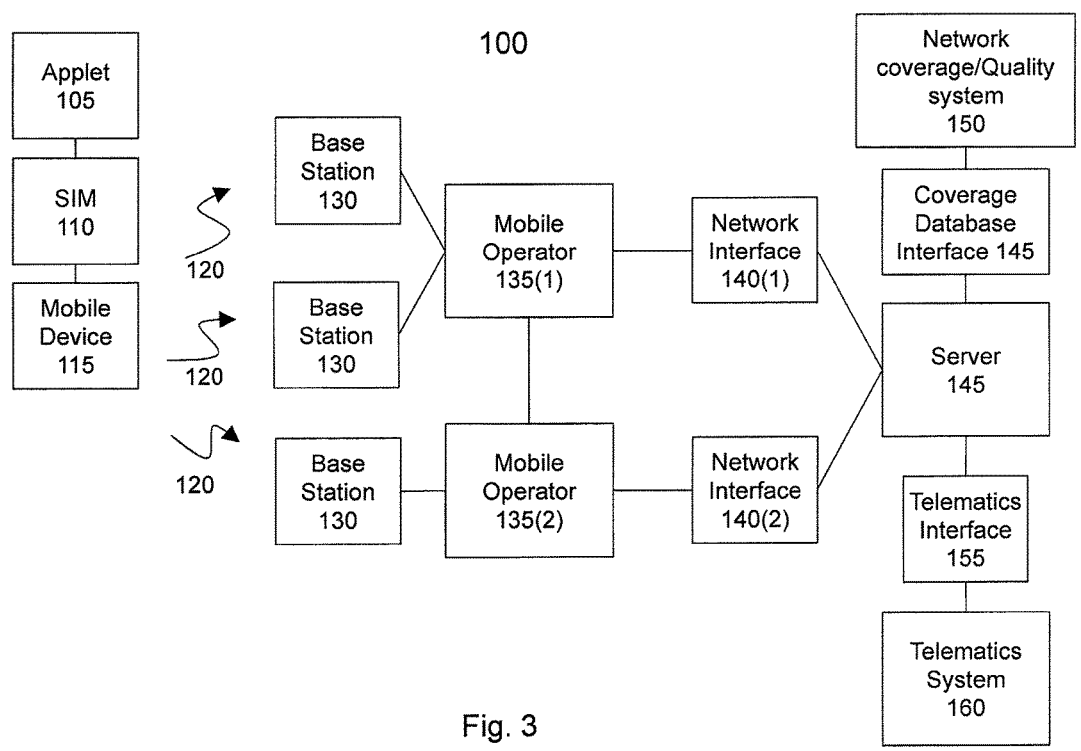
FIG. 3 illustrates a block diagram of the system for providing access to mobile or cellular communication services and for the server to gather information for subscription selection according to an embodiment of the present invention.

FIG. 3 illustrates a block diagram of the system 100 for providing access to mobile or cellular communication services and for the server 145 to gather information for subscription selection according to an embodiment of the present invention. The mobile device 115 provided is capable of establishing wireless communication with at least one base station 130. The said base station 130 receives signals from at least one mobile operator(s) 135 (1), 135(2). In a scenario, the mobile device 115 can communicate with a home network i.e. of the mobile operator 135(1) or, when in an area not served by the home network, with a visited network i.e. of the mobile operator 135(2). To connect to any of the network, the mobile device 115 must authenticate itself to the network 135. This is done by a challenge-response scheme using a secret key that is only known by the home network 135(1) and the SIM 110. In a roaming scenario, the visited network of the mobile operator 135(2) will forward challenge and response to the home network i.e. mobile operator 135(1). Only when the correct key is shared then only the mobile device 115 is allowed to connect to any of the networks. In addition to the key, the SIM 110 also stores information about which networks are preferred to use by the home network i.e. mobile operator 135(1) and which networks are forbidden to access. This helps the mobile device 115 to try to connect only to available networks that will be accepted by the SIM 110.

The server 145 collects information regarding the choice made by the mobile device 115 in selecting an available network. The server 145 periodically receives the information regarding the balance of quota and validity of the subscriptions from the network interface 140 (1,2). It may also receive information from the third party telematics system 160 over the telematics interface 155 reporting that a device has lost connection; and from the third party network coverage/quality information system 150 over the coverage information interface 145 about the coverage and quality of networks in a certain geography.

Figure 4:
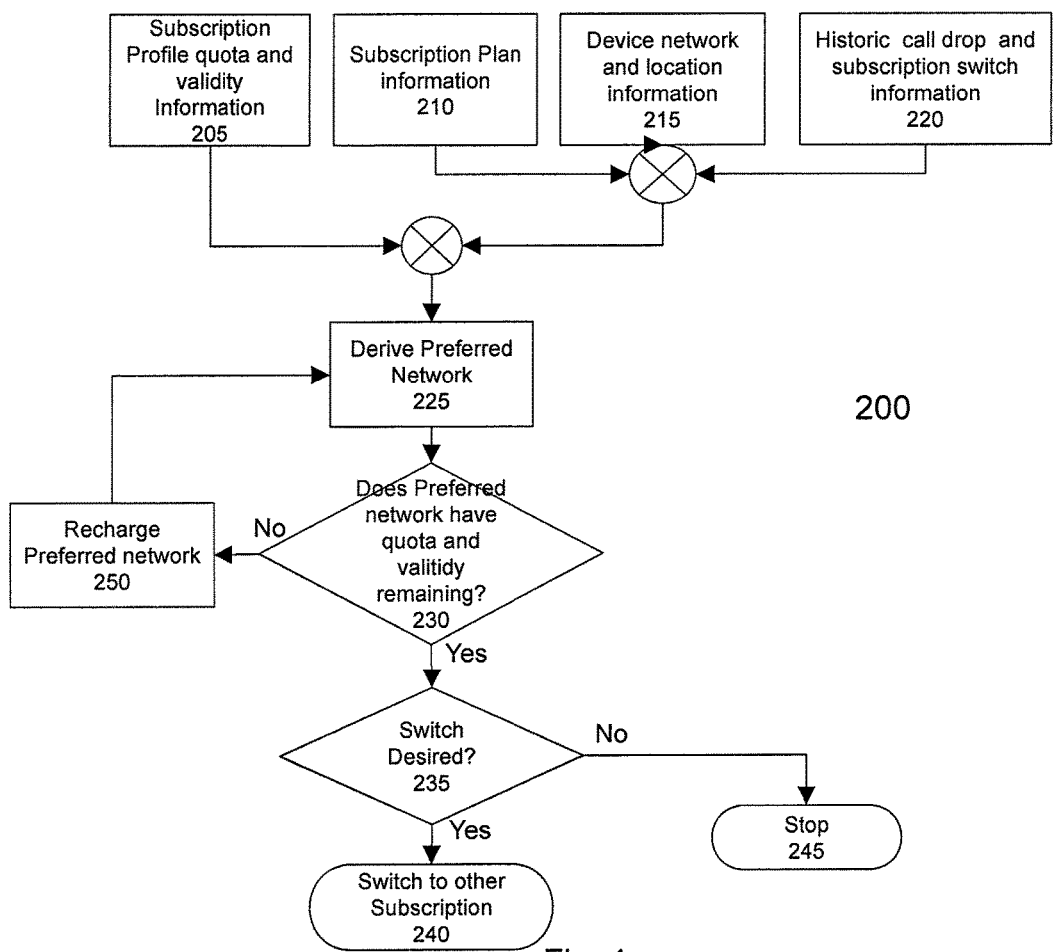
FIG. 4 illustrates a flowchart of the process according to an embodiment of the present invention.

FIG. 4 illustrates a flowchart of the process 200, where the server 145 invokes subscription profile quota/validity information 205, subscription price plan information 210, device network and location information 215 and historic call drop and subscription switch information 220 to assist in decision making regarding subscription selection and subscription recharge.

The server 145 stores the price, quota, validity and recharge related information for all the subscription profiles on the SIM 110, see Table 2.

Using the network interfaces 140, the server 145 will also be able to collect real-time, or close to real-time information about the current balance of quota and validity for each subscription profile on the SIM 110 from the mobile operator 135, see Table 1.

In doing so, it uses the process 200 to determine the preferred subscription which has the best score keeping in mind the balance quota and validity, price of recharge, network quality, history of call drops and subscription switches; best subscription based on the quality of the network based on coverage and history of call drops and subscription switches; and available subscription, which is neither the most price effective nor the best in coverage, yet available as a fallback if neither the preferred subscription nor the best subscription are useable.

With the information from Tables 1 and 2, the process can determine if a switch is desired 235 by keeping in mind the current used subscription and the available subscriptions. In case the server 145 concludes that a switch is essential a subscription switch is initiated.

The server 145 uses the following criteria to establish the risk in using a certain subscription:
Quota/Time risk;
Price risk; and
Quality risk.

Quota/Time risk is determined by establishing the outstanding days of service (ODS)

$$ODS=Quota/[(Quota-Balance)/(Validity\ time-Time\ remaining)]$$

The higher the ODS, the more preferred is the subscription. In an example where there are three subscriptions, the subscription with maximum ODS gets 30, the subscription with lowest ODS gets 10 and the subscription in between gets 20.

The price risk is determined by stack ranking the recharge price. In the example where there are three subscriptions, the lowest priced subscription gets 30, the highest priced gets 10 and the subscription priced in between gets 20.

The quality risk is calculated on a scale of 0-10, depending on the network coverage and historical call drops and network switch events. In the example where there are three subscriptions, the highest quality subscription gets 30, the lowest quality gets 10 and the subscription in between gets 20.

Additionally either two or more than three subscriptions may be managed using similar calculations, but by reducing the scores to 10/20 for two subscription scenarios, and extending the scores to 10/20/30/40 for four subscription scenarios.

Further, the number of undesired switches can be taken into account and weighed in as a quality factor for this current time period and its current behavior, see Table 3, although also incorporated to the historic signal quality information, to enhance the calculation of deciding which is the highest priority network.

$$\text{Drops per day(DpD)}=\text{Drops/(Validity time}-\text{Time remaining)}$$

If the calculated drop per day is significantly higher (X %) than another network its priority shall be lower than that network.

If (DpD for Operator A>(1+X)*DpD for Operator B) then
Operator B has higher priority
else
Operator A has higher priority If the calculated drops per day exceeds a certain threshold Y it should get a lower rating than all other networks not exceeding the threshold. These calculations are reset each time a new validity period starts.

Figure 5:
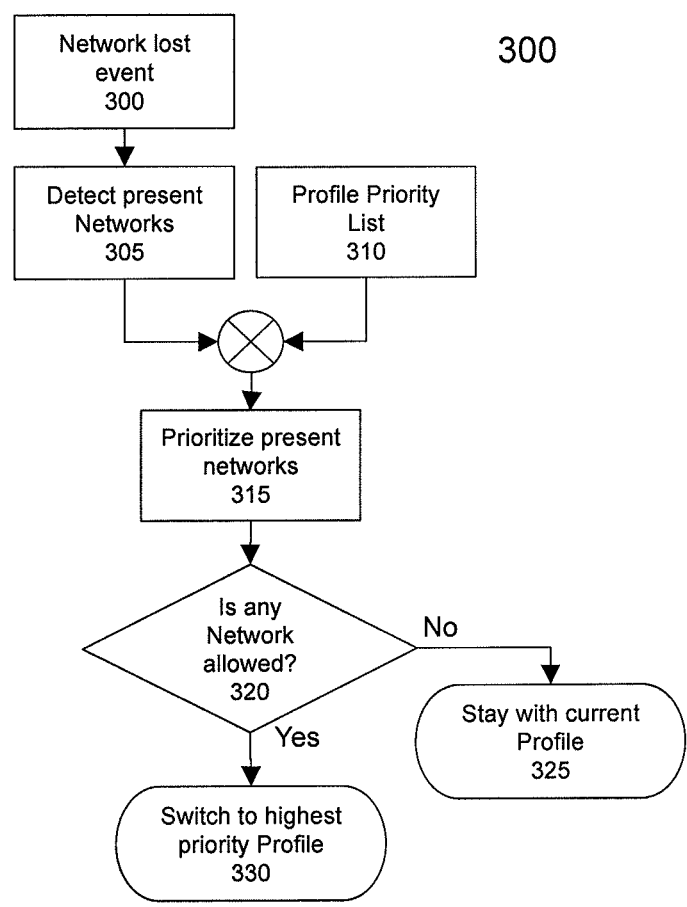
FIG. 5 illustrates a flow chart of fallback functionality the applet implements according to an embodiment of the present invention.

FIG. 5 illustrates a flow chart of fallback functionality that the applet 110 implements in order to overcome the situation when a network has been lost 300 and the server 145 cannot receive or send any instructions. The applet 110 will detect the networks that are currently present 305 and combine that list with a pre-configured profile priority list 310 in order to prioritize present networks 315. The applet will then check if any of the present networks is in the prioritized list 320 and if any of the present network is allowed, switch to the highest priority profile 330 in order to connect. If none of the present networks is allowed, the applet stops execution and stays with the current profile 325.

The present invention provides a system and a method to decide which mobile operator subscription is to be used at a certain location depending on available networks, price and quota. There are other solutions basing the selection on only location parameters, or location and signal quality, or even location, signal quality and price, but none of these makes any decision based on quotas or forecasted usage. The present invention also takes into account the current balance of a subscription and its quota. This makes the present invention unique in deciding which subscription should be used at any given time and at any given location. It also ensures that the owner of the SIM can ensure that all quotas are being used uniformly so as to avoid recharging as much as possible and utilizing the quota already paid for.

The invention claimed is:

1. A system to control usage of a subscription in a mobile device comprising:
    a plurality of subscriptions of at least two or more mobile networks;
    a subscription profile associated with each of the subscriptions;
    a subscriber indentity module (SIM) card capable of switching among different mobile networks and configured to run an applet;
    a server having a network interface, a database coverage interface and a telematics interface and communicating with the mobile device through the network interface;
    the network interface configured to transmit commands between the server and the SIM card applet to receive real-time information about prices, quotas and validity from the network operators of the mobile networks;
    wherein the server further processes and stores information related to identity and network related data such as network territory, network coverage map, history of network drops, subscription profile switch events and quota-price-validity-bandwidth attached to a subscription profile; and
    connects to the mobile networks providing the subscription profile periodically, to retrieve, calculate and store actual usage and outstanding quota and validity for SMS, data and minutes for each subscription profile;
    connects via the network interface to the SIM card applet to receive information from the applet about network loss and network coverage;
    wherein the server based on the information received from the applet determines and stores the network periodically with minimum network loss and maximum network coverage and;
    connects with a third party telematics system through the telematics interface to receive information when a mobile device loses an acceptable quality of network in the connection; and
    communicates with and commands the SIM card applet to initiate selection of subscription based on available quota, validity and network coverage.

2. The system to control the usage of a subscription in a mobile device as claimed in claim 1, further comprising the server connected to a network coverage quality system through the database interface, wherein the database interface retrieves information of the presence and quality of the mobile network to store within the server.

3. The system to control the usage of a subscription in a mobile device as claimed in claim 1, wherein the SIM card could be one of the a UICC or eUICC or USIM card.

4. The system to control the usage of a subscription in a mobile device as claimed in claim 1, wherein the applet switches from current profile to a different profile in the case there is no network coverage.

* * * * *